United States Patent
Karam

(10) Patent No.: US 7,599,485 B2
(45) Date of Patent: Oct. 6, 2009

(54) COMMUNICATIONS SYSTEM EMPLOYING SINGLE-PAIR IDENTITY CIRCUIT FOR REMOTELY POWERED DEVICE

(75) Inventor: Roger Karam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 969 days.

(21) Appl. No.: 11/166,440

(22) Filed: Jun. 24, 2005

(65) Prior Publication Data

US 2006/0291405 A1     Dec. 28, 2006

(51) Int. Cl.
    *H04M 5/00*     (2006.01)
(52) U.S. Cl. .................. 379/413; 379/307; 379/322; 379/323; 709/228
(58) Field of Classification Search .......... 379/413, 379/307, 322, 323; 370/110, 79, 181, 185, 370/351
    See application file for complete search history.

(56) References Cited

U.S. PATENT DOCUMENTS

| | | | |
|---|---|---|---|
| 5,148,144 A | 9/1992 | Sutterlin et al. | 340/310.01 |
| 5,991,885 A | 11/1999 | Chang et al. | 713/300 |
| 5,994,998 A | 11/1999 | Fisher et al. | 340/310.01 |
| 6,016,519 A | 1/2000 | Chida et al. | 710/19 |
| 6,115,468 A | 9/2000 | De Nicolo | 379/413 |
| 6,140,911 A | 10/2000 | Fisher et al. | 340/310.01 |
| 6,175,556 B1 | 1/2001 | Allen, Jr. et al. | 370/293 |
| 6,246,748 B1 | 6/2001 | Yano | 379/2 |
| 6,348,874 B1 | 2/2002 | Cole et al. | 340/825.01 |
| 6,366,143 B1 | 4/2002 | Liu et al. | 327/142 |
| 6,393,050 B1 | 5/2002 | Liu et al. | 375/219 |
| 6,496,103 B1 | 12/2002 | Weiss et al. | 340/310.01 |
| 6,535,983 B1 | 3/2003 | McCormack et al. | 713/310 |
| 6,701,443 B1 | 3/2004 | Bell | 713/300 |

(Continued)

FOREIGN PATENT DOCUMENTS

EP    0 777 357 A2    6/1997

OTHER PUBLICATIONS

IEEE 802.3af DTE Power via MDI Task Force May 2000 Interim meeting; May 24-25, 2000 Ottawa, ON; http://www.ieee802.org/3/af/public/may00/; IEEE802.3af Task Force, May 2000.

*Primary Examiner*—Creighton Smith
(74) *Attorney, Agent, or Firm*—BainwoodHuang

(57) ABSTRACT

A discovery technique employs a single-conductor-pair identity circuit for a remotely powered device. A communications system includes a first communications device (e.g. and IP telephony switch) capable of supplying power at an interface, and a second communications device coupled to the interface via a multiple-conductor-pair cable. The second communications device may be a terminal device such as an IP telephone or an intermediate device such as a re-wiring device or a mid-span power supply. The first communications device includes a single-pair identity signal generator that generates a single-pair identity signal on one conductor pair of the cable, and a single-pair sensor operative to sense a conduction characteristic of the conductor pair indicative of the presence of a single-pair identity circuit. The second communications device includes the single-pair identity circuit coupled to the conductor pair and activated by the single-pair identity signal to create the predetermined conduction characteristic. Examples of single-pair identity circuits include circuits employing zener diodes and other physical-layer circuit elements.

29 Claims, 7 Drawing Sheets

U.S. PATENT DOCUMENTS 6,804,351 B1   10/2004   Karam ........................ 379/413
2004/0263250 A1*  12/2004   Macciocchi .............. 330/207 P 2005/0014309  A1   1/2005   Hedler et al.

* cited by examiner

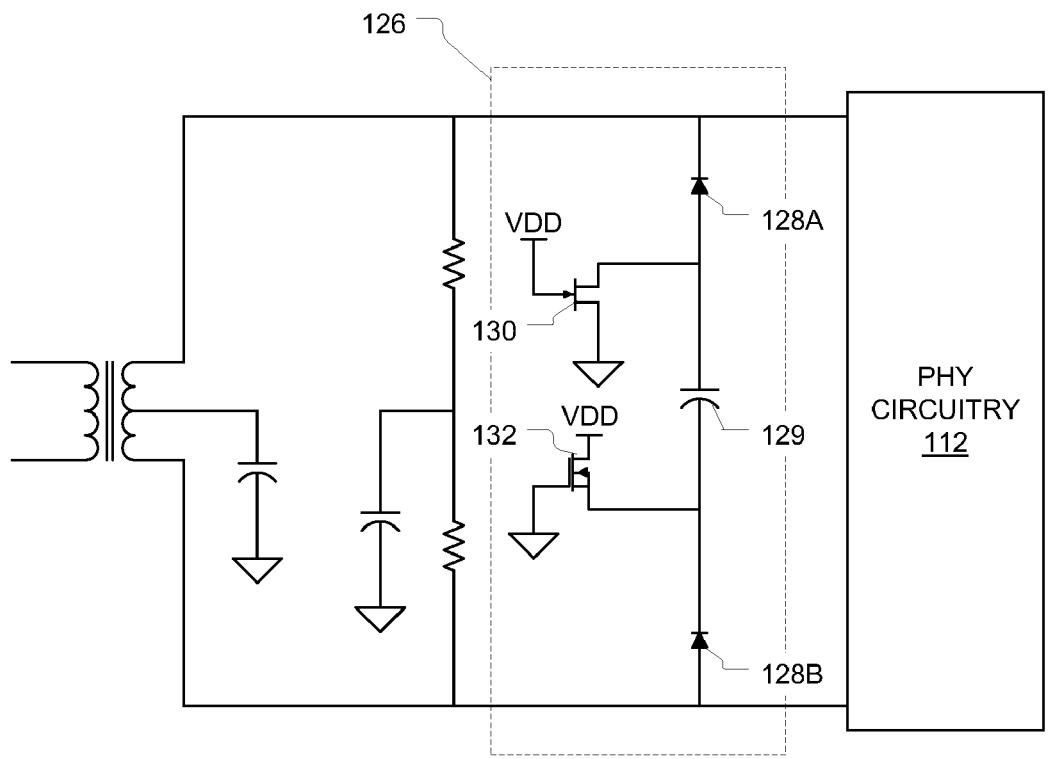
Fig. 9
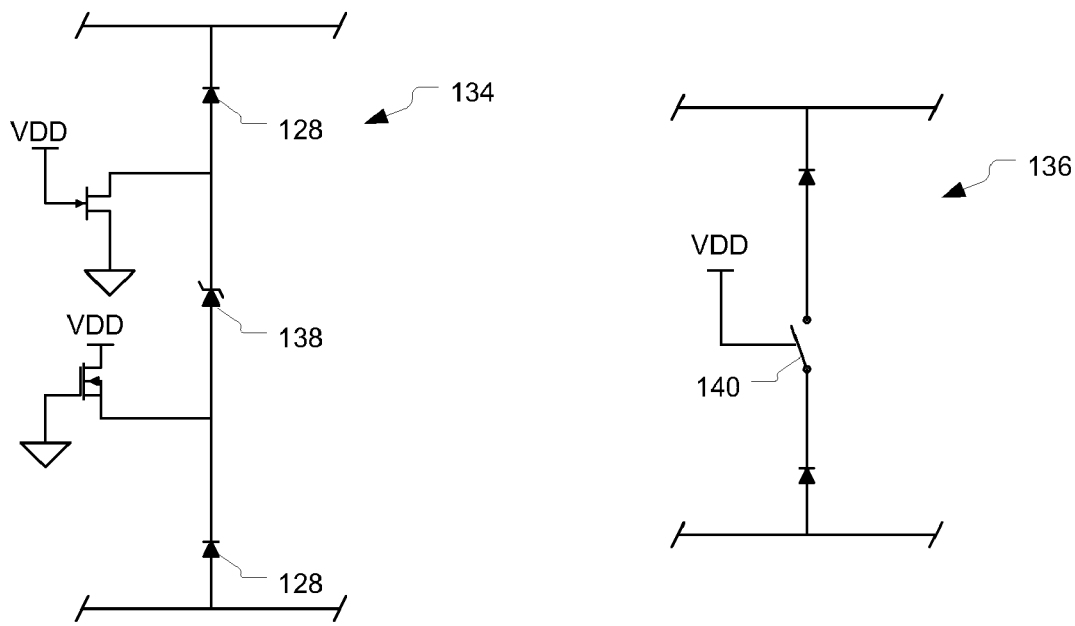
Fig. 10
Fig. 11

COMMUNICATIONS SYSTEM EMPLOYING SINGLE-PAIR IDENTITY CIRCUIT FOR REMOTELY POWERED DEVICE

BACKGROUND

Communications systems often utilize a technique in which a relatively large central component such as a switch provides operating power to multiple smaller, distributed terminal devices such as telephones. The power is typically provided in direct-current (DC) form over the same conductors that carry the communications signals. It is often considerably more efficient, both operationally and financially, to use a central power supply and distribution circuitry rather than using independent power supplies in each terminal device. Such remote powering has been used in traditional analog telephone systems, and is used today in Internet Protocol (IP) telephone systems for example.

Modem communications systems that employ remote device powering also employ circuits and methods that enable the switch or other central component to discover whether a terminal device is attached to a particular interface before providing power to that interface. Safety and operational efficiency are improved when power is not applied to unconnected/unused interfaces. Generally, discovery involves sensing some aspect of the interface that necessarily has one of two distinct states depending on whether a remotely powered device is present. This can be as simple, for example, as sensing a logic level, or it may involve a more complex interaction of software or firmware processes.

Ethernet technology is widely used as a physical-layer communications medium in IP telephone systems. At present, standard Ethernet interfaces employ unshielded twisted pair (UTP) cables in which multiple conductor pairs are utilized to carry the data signals, as well as remotely supplied power when present. Example of such physical layer interfaces include so-called 10Base T and 100Base T interfaces in which two or more pairs of conductors carry data and power signals from the switch to the telephone, and from the telephone to the switch. From the perspective of either device, one of these pairs may be denoted the "transmit" pair and the other the "receive" pair, depending on the direction that data travels with respect to the device. For the 1000Base T physical layer interface, the transmit/receive distinction does not apply, because data flows in both directions at the same time, while power flows in one direction at all speeds. The physical cable is itself categorized in a standardized fashion using the well-known "Category N" terminology, where N is in the range of 3 to 6, with Category 6 cable being the most modem and capable of carrying very high data rate signals with good fidelity.

In the UTP Ethernet interfaces of IP telephone systems, it has been known to use two specific types of discovery circuitry, referred to as "common mode" and "differential mode" discovery circuitry. Both types utilize both the transmit and receive conductor pairs of an interface (or two pairs out of the 4 pairs to detect the presence of a device in need of inline power). In common mode discovery, the switch includes a signal generator connected between respective center taps of isolating transformers for the two pairs that are located in the switch, and the telephone includes a resistor similarly connected between respective center taps of isolating transformers located in the telephone for the two pairs of conductors. In operation, the switch applies a voltage V1 followed by a voltage V2 across the conductor pairs while measuring the respective currents I1 and I2, and uses the voltage and current differences to calculate the value of the attached resistance (i.e., R=(V2−V1)/(I2−I1)). In differential mode discovery, the switch includes a pulse generator connected to one of the conductor pairs of the interface, and the telephone includes loopback switches that create a connection between the two conductor pairs. A discovery pulse generated by the pulse generator of the switch on the one conductor pair is returned to the switch on the other conductor pair, where its presence or absence can be detected as an indication of the presence or absence of the telephone.

SUMMARY

Existing discovery techniques utilized in systems having remote device powering capabilities, such as the common-mode and differential-mode discovery techniques discussed above, may be limited to detecting the presence or absence of only one device at an interface. In many systems such a limitation is not problematic, because no more than one device is ever connected to an interface. However, there are systems in which it may be desirable to connect multiple devices to a single powered interface and to discover the devices independently. As an example, in an Ethernet interface of an IP telephone system, it may be desirable to place an active or passive device between a power-providing switch and a power-consuming IP telephone. An example of such an intermediate device is a re-wiring device that enables the connection of two switches to a single IP telephone in a redundancy configuration to improve the availability of the system. In such a system, it is useful for the switches and/or the IP telephone to detect the presence of the re-wiring device during initialization, so as to properly configure itself depending on whether or not it is connected for redundancy. However, any discovery technique for such a device must operate compatibly with the common-mode and/or differential-mode discovery circuitry that will be present in the switch and IP telephone or similar devices. Some IP telephones or end devices required to accept inline power may need to support both the common mode and the differential discovery in order to meet some legacy requirements. This leaves few options for enabling additional attached devices to identify themselves without interfering with other discovery schemes.

In accordance with the present invention, a discovery technique employing a single-conductor-pair identity circuit for a remotely powered device is disclosed. A communications system includes a first communications device capable of supplying power at an interface, such as an IP telephony switch. A second communications device is coupled to the interface of the first communications device via a multiple-conductor-pair cable. The second communications device may be a terminal device such as an IP telephone, or it may be an intermediate device such as a re-wiring device, a mid-span power supply, or other device.

The first communications device includes a single-pair identity signal generator that generates a single-pair identity signal on one conductor pair of the cable, wherein the single-pair identity signal has an amplitude greater than the amplitude of communications signals appearing on the conductor pair and substantially less than the amplitude of a power signal generated on the conductor pair by the first communications device. The first communications device also includes a single-pair sensor operative to sense a predetermined conduction characteristic of the conductor pair of the cable indicative of the presence of a single-pair identity circuit. Such a sensor may consist of a receive buffer (e.g. operational amplifier) and an analog-to-digital circuit that resolves a drop in signal amplitude due to a clamping effect. Other analog sensor circuitry may consist of a buffer and a diode/capacitor peak detector that converts an AC signal from the conductor pair into a DC voltage, and a comparator for comparing the DC voltage to a pre-defined voltage threshold to produce a single logic bit for a valid detection.

The second communications device includes the single-pair identity circuit coupled to the conductor pair of the cable, which is activated by the single-pair identity signal on the conductor pair to create the predetermined conduction characteristic of the conductor pair to be sensed by the single-pair sensor of the first communications device. Several examples of such single-pair identity circuits are shown, including circuits employing single zener diodes, back-to-back zener diodes, and other collections and arrangements of circuit elements that operate at the physical layer of the interface.

Among the benefits of the disclosed technique are its operation at the physical (PHY) layer, which makes it generally inexpensive and robust. By using only a single pair of the multiple-pair cable, the technique can be made compatible with other discovery circuitry that may also be connected to the cable, such as common-mode and differential-mode discovery circuitry. Additionally, a device classification scheme can be created based on different patterns of connections of single-pair identity circuits to the multiple conductor pairs of a cable, and/or the use of different voltage thresholds or other operating characteristics of the single-pair identity circuits. Several applications of the disclosed single-pair discovery technique are also disclosed that illustrate its flexibility.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 9 shows an alternative single-pair identity circuit employing one pair of diodes for unidirectional clamping of an identity signal;

FIGS. 10 and 11 show alternative implementations of the single-pair identity circuit of FIG. 9;

DETAILED DESCRIPTION

Figure 1:
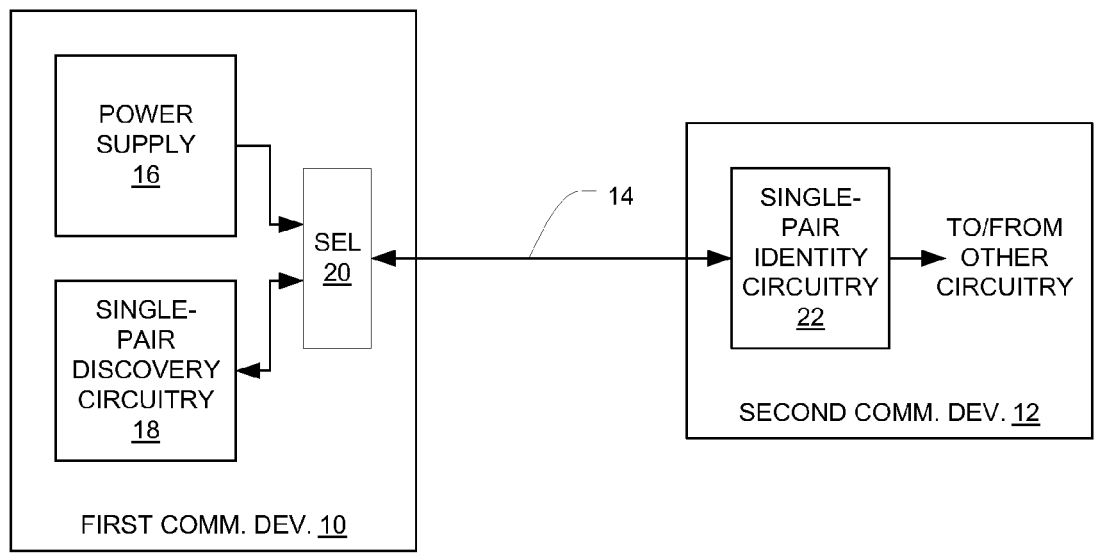
FIG. 1 is a block diagram of a communications system employing single-pair discovery and identity circuitry in accordance with the present invention.

FIG. 1 shows a communications system in which a first communications device 10 (such as a switch or similar hub device) is coupled to a second communications device 12 (such as an Internet Protocol (IP) telephone, security device or re-wiring device as described in more detail below) via a multiple-conductor-pair cable 14 (for example, a Category 5/6 unshielded twisted pair cable commonly used for Ethernet communications). The first device 10 includes a power supply 16 capable of supplying inline power over the twisted pair cable 14, single-pair discovery circuitry 18, and selection circuitry (SEL) 20. The second device 12 includes single-pair identity circuitry 22 as well as other normal operating circuitry not shown in FIG. 1.

In operation, the selector 20 initially connects the single-pair discovery circuitry 18 to the cable 14, and the discovery operation (described below) ensues. Assuming that the presence of a powered device is detected, then the selector 20 subsequently connects the power supply 16 to the cable 14. The selector 20 may be realized in a variety of ways, and may not be a distinct physical element in the first communications device 10. For example, it may consist of separate circuits in the power supply 16 and single-pair discovery circuitry 18 that selectively enable and disable these components in a coordinated fashion.

Figure 2:
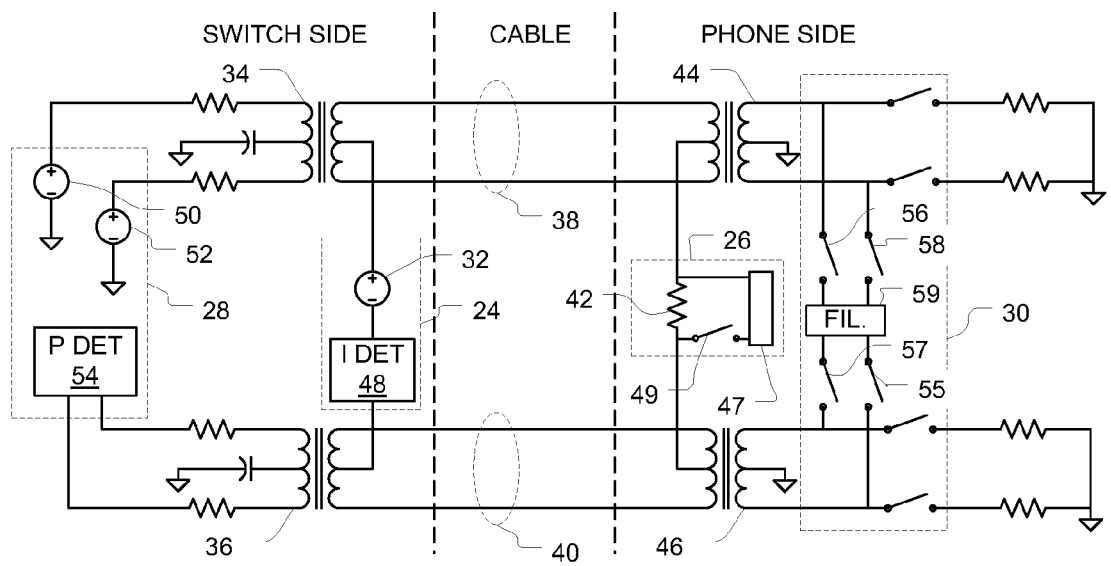
FIG. 2 is a schematic diagram of a communications system employing multiple-pair discovery and identity circuitry as known in the art.

FIG. 2 shows pertinent parts of a communications system including discovery circuitry and identity circuitry as known in the art. The discovery circuitry typically resides in a central device such as a switch, and thus is shown with the label "Switch Side" in FIG. 2, whereas the identity circuitry typically resides in a terminal device such as an IP telephone, and thus is shown with the label "Phone Side" in FIG. 2. Two types of discovery and identity circuitry are shown. The first type is referred to as "common mode" and includes common-mode discovery circuitry 24 and common-mode identity circuitry 26. The second type is referred to as "differential" and includes differential discovery circuitry 28 and differential identity circuitry 30. The common-mode and differential circuits are shown together in FIG. 2 for illustrative purposes only—in some communications systems, only one type is used at a given interface.

The common-mode discovery circuitry 24 includes a signal generator 32 coupled between center taps of respective transformers 34 and 36 of respective conductor pairs 38 and 40 of the interconnecting cable. The common-mode identity circuitry 26 consists of a 25 k resistor 42 connected between the center taps of respective transformers 44 and 46 for the respective conductor pairs 38 and 40 of the cable, along with associated load-isolating switch 47 that isolates a load (DC/DC converter and the like) 49 as specified in the IEEE 802.3af standard. During a common mode discovery operation, the signal generator 32 generates two voltages across the two pairs 38 and 40 of the cable, measures the current associated with each voltage, and calculates a slope value as $(V2-V1)/$ (I2-I1). It will be appreciated that if the identity circuitry 26 is present, the calculated slope value will be approximately equal to the resistance of the resistor 42. If the calculated slope value falls within a range as specified by the 802.3af standard, indicating that the powered device is present, then inline power is applied from the switch to power the powered device.

The differential discovery circuitry 28 includes a pair of pulse generators 50 and 52 coupled to respective inputs of the transformer 34 and pulse detection circuitry (PDET) 54. Note that this circuitry may reside in an Ethernet "PHY" integrated circuit that implements the physical layer of the network interface. The differential identity circuitry 30 includes switches 55, 56, 57 and 58 and a filter circuit (FIL) 59. The switches 55-58 are normally closed when power is not present in the phone, and become open when power is present. The filter circuit 59 includes passive and/or active circuitry that helps distort real packet traffic to avoid self loopback of packet traffic, while permitting the passage of discovery signals.

During the discovery operation, the pulse generators 50 and 52 co-operate to generate one or more differential electrical pulses across the conductors of the conductor pair 38. The pulse width and amplitude may be programmable to adjust their frequency to the passband of the filter circuit 59 to minimize signal loss. When a terminal device containing the differential identity circuitry 30 is present, the discovery pulse is coupled onto the other conductor pair 40 by the switches 56 and 58 and switches 55 and 57, and this pulse is detected by the pulse detection circuitry 54. When a terminal device containing the differential identity circuitry 30 is not present, no pulse is coupled onto the conductor pair 40, and thus the pulse detection circuitry 54 is not triggered.

As previously mentioned, both the common-mode discovery technique and the differential discovery technique have generally been used when there is at most one terminal device coupled to a particular interface of the central device, as is commonly the case in an IP telephony system for example. Thus, prior art discovery techniques have generally not provided the ability to separately detect the presence or absence of multiple devices, but rather have been limited to detecting the presence or absence of a single device. The presently disclosed single-pair discovery technique may be used in conjunction with prior-art techniques such as the common-mode and differential techniques illustrated in FIG. 2 without interfering with their proper operation. It is thus possible to independently test for the presence/absence of multiple devices coupled to single interface. In the following description, both the general approach and specific examples of the single-pair discovery technique are given, along with examples of the use of the technique in such multiple-device configurations.

Figure 3:
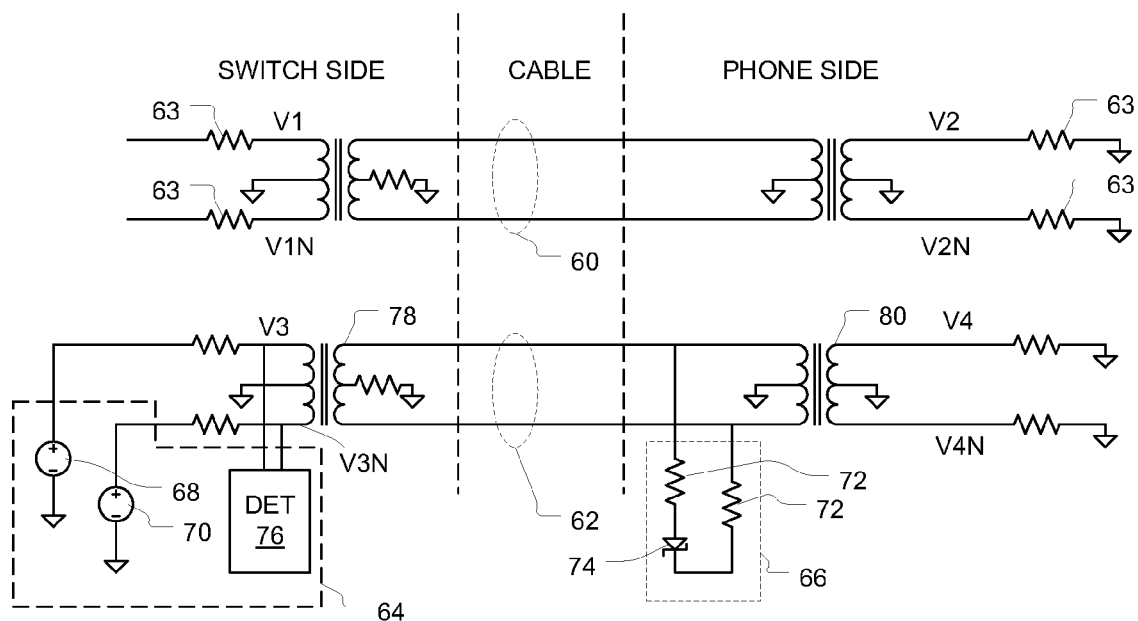
FIG. 3 is a schematic diagram showing one implementation of a communications system employing single-pair discovery and identity circuitry as in FIG. 1.

FIG. 3 shows discovery and identity circuitry used in connection with a communications interface utilizing two conductor pairs 60 and 62. The communications interface is a balanced, 100-ohm interface employing pairs of 50-ohm terminating resistors 63 at both ends of each conductor pair. Discovery circuitry 64 and identity circuitry 66 are coupled to one of the conductor pairs 62. It will be observed that the other conductor pair 60 is not coupled to any discovery circuitry. Thus, the discovery technique illustrated in FIG. 3 utilizes only a single pair of the multiple pairs of conductors generally required for the communications interface, in contrast to the prior art techniques of FIG. 2 which each utilize two pairs.

The discovery circuitry 64 includes identity signal generators 68 and 70 which operate similarly to their counterparts 50 and 52 in the differential discovery circuitry 28 of FIG. 2. The identity circuitry 66 includes two low-value resistors 72 (e.g. 10 ohms each) and a zener diode 74 or an equivalent circuit. The breakdown voltage of the zener diode 74 is selected to be sufficiently high that breakdown does not occur in response to the data communications signals appearing on the conductor pair 62 during normal operation, and thus during normal operation the identity circuitry 66 presents an essentially open circuit to the conductor pair 62. Additionally, the breakdown voltage is selected in conjunction with the amplitude of the discovery pulse signal from the identity signal generators 68 and 70 such that breakdown does occur when the discovery signal is transmitted on the conductor pair 62. As an example, in the case of 10/100 Ethernet signals whose maximum amplitude is less than 5.6v peak-to-peak for 10BaseT and 2v peak-to-peak for 100BaseT, a breakdown voltage of greater than 5.6 volts may be employed. A lower breakdown threshold may be used for signals having rates higher than 10BaseT. When a discovery signal of this amplitude appears on the conductor pair 62, the zener diode 74 conducts reverse current and the identity circuit 72 presents a relatively low-impedance path for current flow. This altered conduction characteristic can be sensed by sensing circuitry 76 within the discovery circuitry 64 as an indication that a device containing the identity circuitry 66 is connected to the conductor pair 62.

Figure 4:
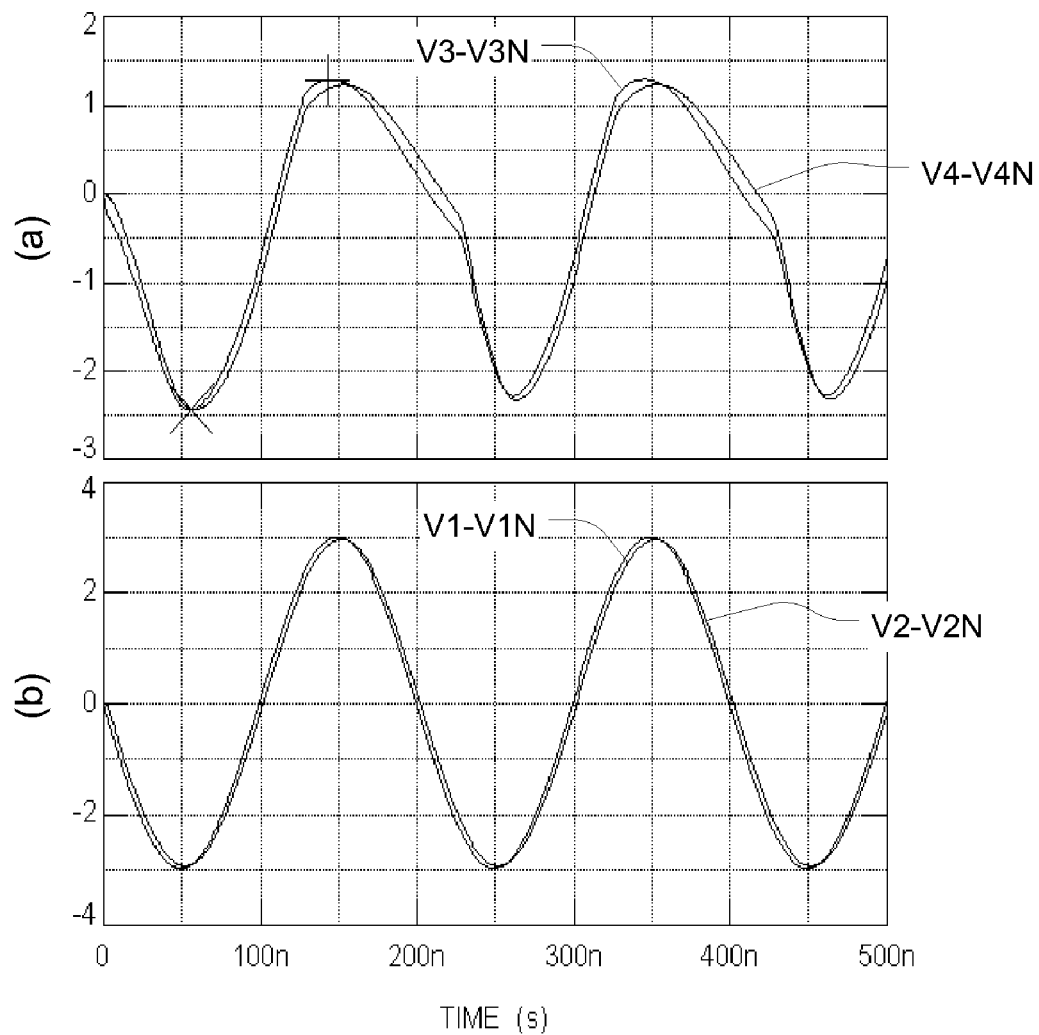
FIG. 4 (consisting of FIGS. 4(a) and 4(b)) presents waveform diagrams of voltage signals appearing in the communications system implementation of FIG. 3.

FIG. 4 illustrates exemplary voltage waveforms in the circuitry shown in FIG. 3 in response to a 6-volt peak-to-peak sine wave input signal. One or more cycles of such a sine wave may be used as the discovery pulses. Such pulses are readily available, as they resemble the 10BaseT data and are generated by the identity signal generators 68 and 70 of FIG. 3. FIG. 4(*a*) shows waveforms (V3-V3N) and (V4-V4N), which as shown in FIG. 3 appear across respective terminals of isolation transformers 78 and 80 connected to the conductor pair 62. Both of these waveforms have a positive peak of approximately 1.3 volts and a negative peak of approximately −2.4 volts. The positive peak is limited by a clamping effect of the zener diode 74 when forward conduction occurs, and the negative peak is limited by a clamping effect of the zener diode 74 when reverse (breakdown) conduction occurs.

The waveforms V3-V3N and V4-V4N can be contrasted with the waveforms V1-V1N and V2-V2N for conductor pair 60 shown in FIG. 4(*b*), which have the full 6-volt peak-to-peak amplitude due to the absence of any identity circuitry like the identity circuitry 66. Thus, in the illustrated embodiment the detection circuitry 76 (FIG. 3) can detect the presence of the identity circuitry 66 by determining whether waveform V1-V1N or waveform V3-V3N is present across the primary of the transformer 28.

Figure 5:
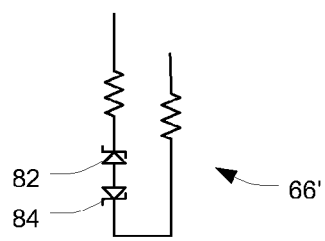
FIGS. 5 and 6 show alternative implementations of single-pair identity circuits similar to a single-pair identity circuit appearing in the communications system implementation of FIG. 3.
Figure 6:
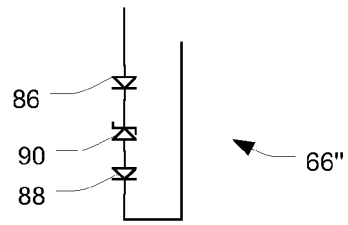

The specific identity circuitry 66 of FIG. 3 may not be suitable for use in conjunction with 10BaseT Ethernet data signaling, which has a peak-to-peak amplitude of 5.6 volts maximum in the 802.3 specification and is typically about 5v max. FIGS. 5 and 6 illustrate alternative embodiments for the single-pair identity circuitry 66, shown as identity circuitry 66' and 66'' respectively, that may be more suitable. The identity circuitry 66' of FIG. 5 includes a pair of back-to-back zener diodes 82 and 84 (or equivalent circuitry) having 2.2 volt breakdown voltages. Using this circuit, the peak positive and negative amplitudes for the signal V3-V3N are 2.6 volts and −2.6 volts respectively, resulting in a differential voltage of about 5.2v instead of the 6v peak-to-peak. Thus, no clamping will occur at normal 10BaseT signaling levels. One potential drawback with the circuit 66' is excessive capacitance that can undesirably load the conductor pair 62 and reduce the amplitude of the data signals. Lower capacitance and temperature compensated equivalent circuitry may be deployed. As an example, the circuit 66'' of FIG. 6 addresses this potential problem by using a pair of diodes 86 and 88 which serve to isolate the lower-amplitude data signals from a single zener diode 90 or equivalent circuit used for identification purposes. Additionally, a limited loss in 10BaseT amplitude may be acceptable in some systems. 10BaseT was originally designed for Category 3 cabling which has greater loss at 5 and 10 MHz frequencies than Category 5 and 6 cabling, which is in more predominant use today. Also, PHY technology has advanced to include better receive threshold resolution that can resolve smaller amplitudes.

Figure 7:
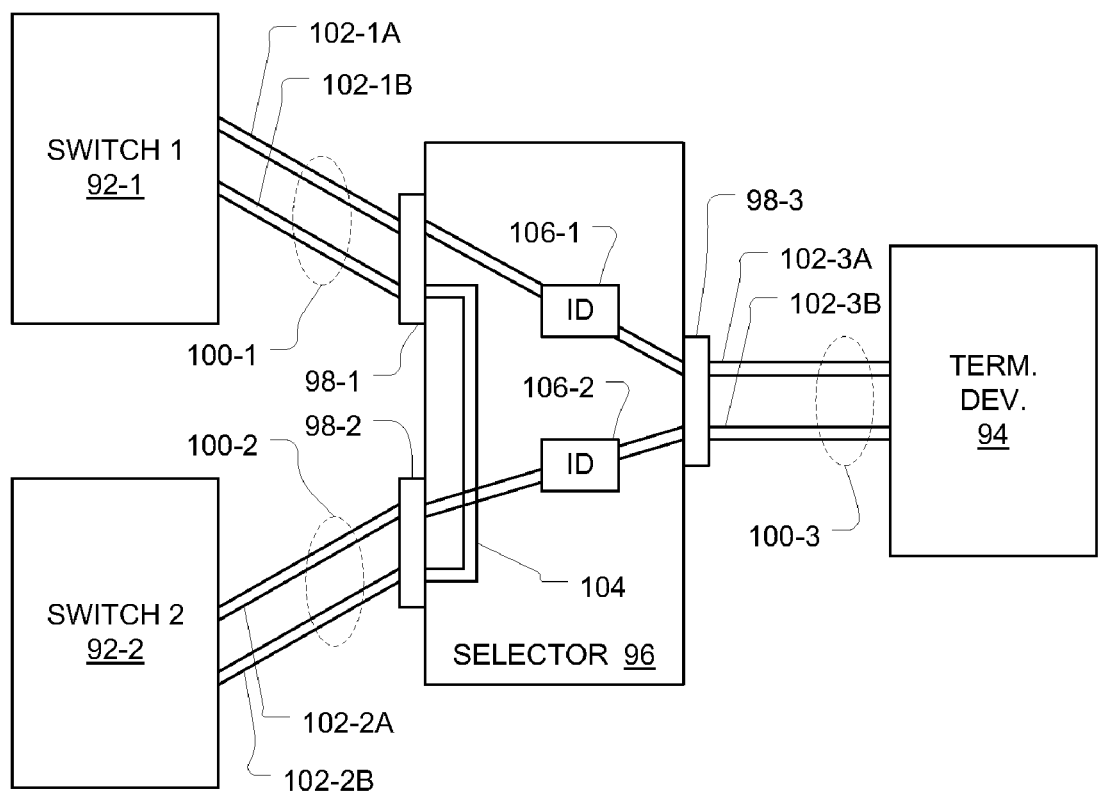
FIG. 7 is a block diagram of a redundant arrangement of communications switches using a re-wiring device including single-pair identity circuits in accordance with the present invention.

FIG. 7 shows an arrangement of two switches 92-1 and 92-2 and a terminal device (TERM DEV) 94 such as an IP telephone. In this arrangement, a selector (SEL) 96 routes conductor pairs to provide a redundant connection between the switches 92-1, 92-2 and the terminal device 94. Specifically, the selector 96 has RJ45 connectors 98-1 and 98-2 connected to the respective switches 92-1 and 92-2 by respective cables 100-1 and 100-2, each including two sets of transmit & receive conductor pairs. The selector 96 also has an RJ45 connector 98-3 connected to the terminal device 94 by a respective multi-conductor-pair cable 100-3. As shown, one set 102-1A of transmit and receive conductor pairs of the first switch 92-1 is connected via the selector 96 to a corresponding set 102-3A of transmit & receive conductor pairs of the terminal device 94. A similar connection is made between one set 102-2A of transmit and receive conductor pairs of the second switch 92-2 and a corresponding set 102-3B of transmit and receive conductor pairs of the terminal device 94. The selector 96 also provides a connection 104 between a set 102-1B of transmit and receive conductor pairs of the first switch 92-1 and a set 102-2B of transmit and receive conductor pairs of the second switch 92-2.

The selector 96 includes two single-pair identity circuits 106-1 and 106-2 each connected to a respective conductor pair that provides through connections between a respective RJ45 connector 98-1 or 98-2 and the RJ45 connector 98-3. Each single-pair identity circuit 106-1, 106-2 may be implemented in a variety of ways, including in a manner similar to the identity circuit 66' of FIG. 5. The purpose of the identity circuits 106-1 and 106-2 is to enable each switch 92-1, 92-2 to sense the presence of the selector 96 independently of each switch's sensing of the terminal device 94, which may include a prior-art common-mode or differential-mode identity circuit (or both) such as shown in FIG. 2. By such independent sensing of the presence of the selector 96, each switch 92-1 and 92-2 can infer that it is connected in a redundancy arrangement and then operate accordingly. Also, the terminal device 94 may be able to detect the presence of such a selector 96 using similar methods once powered.

While two identity circuits 106-1 and 106-2 on two pairs are shown and a specific redundancy configuration is shown, more pairs may be connected to such identity circuits in the selector 96 and the concept applied to other redundancy configurations. If the terminal device 94 were to have a single pair identity circuit, it would be selected on the alternate pairs where it causes no interference with the presence of circuits inside the selector 96. Also it may be such that it complements a single pair identity circuit that may be present in the selector 96 and coupled to the same conductor pair. For example, if the selector 96 has a bi-directional identity circuit (discussed below) at a voltage V1, the terminal device 94 may have a voltage clamp at a lower voltage V2 that will disappear as the terminal device 94 is powered.

Figure 8:
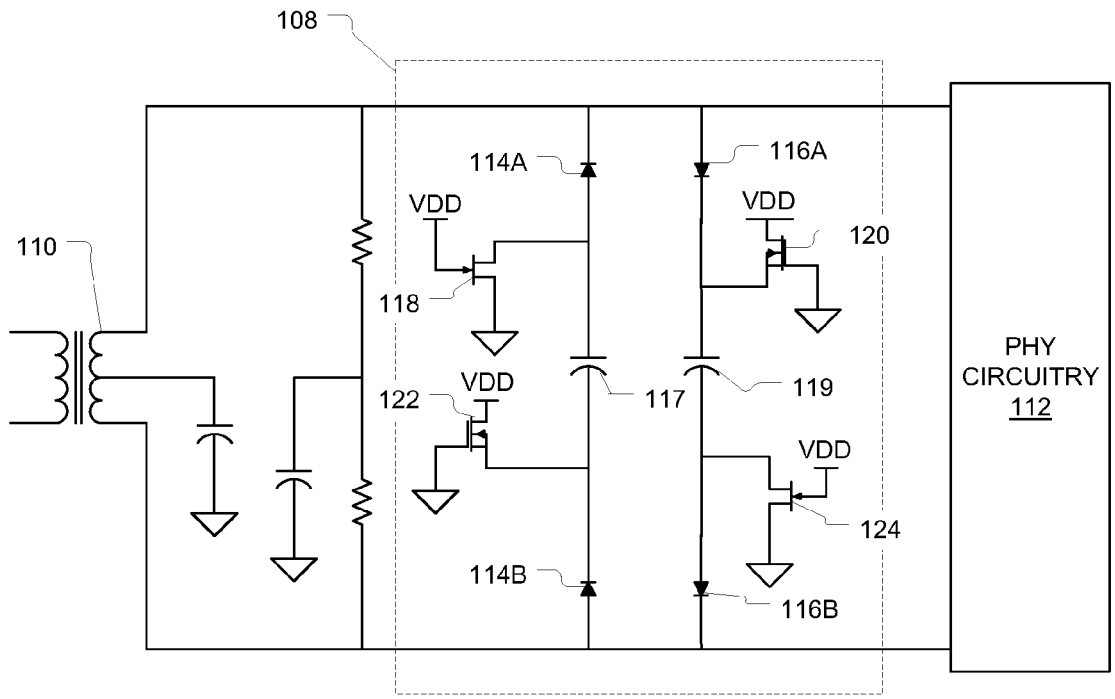
FIG. 8 shows an alternative single-pair identity circuit employing pairs of diodes for bidirectional clamping of an identity signal.

FIG. 8 shows single-pair identity circuitry 108 used on the "PHY" side of an isolating transformer 110, i.e., connected to the internal physical-layer (PHY) circuitry 112 within a terminal device rather than to the multi-conductor-pair cable such as in FIG. 3. The identity circuitry 108 includes two pairs of diodes 114A/114B and 116A/116B, wherein the diodes of each pair are in series and the two pairs are oriented with opposite polarities across the secondary of the transformer 110. The diodes 114A and 114B are separated by a DC blocking capacitor 117, and the diodes 116A and 116B are separated by a DC blocking capacitor 119. When power (Vdd) is off, the diodes 114, 116 provide for bi-directional clamping of identity signals that are received from the far end. When power (Vdd) is on, the transistors 118, 120, 122 and 124 and blocking capacitors 117, 119 serve to reverse-bias the diodes 114, 116 such that the identity circuitry 108 is deactivated, allowing the Ethernet data to flow without distortion. It is possible to stack low-forward-voltage diodes to tune the threshold of the clamp. By using different numbers of stacked diodes with different overall thresholds, different device types can be identified or classified, thus providing information about a device before power is applied to it.

FIG. 9 shows single-pair identity circuitry 126 employing only two diodes 128 in a unidirectional clamping arrangement, with a DC blocking capacitor 129 and transistors 130, 132 being used to deactivate the circuitry 126 when power (Vdd) is on.

FIGS. 10 and 11 illustrate alternative single-pair identity circuits 134, 136. The circuit 134 is similar to the circuit 126 of FIG. 9 but employs a zener diode 138 (or an equivalent circuit) between the diodes 128. The circuit 136 (FIG. 11) employs a single switch 140 that is closed when power (Vdd) is off, and open when power is on. This switch may also be open when power is not applied, and a discovery signal long enough in time may be converted from ac to dc providing for enough dc voltage to close the switch to provide the clamping effect. Such an effect provides a dual method to find the single pair identity circuit, and thus acts as a double check. As an example, the number of sine wave cycles used for discovery may be increased in order to allow a circuit in a terminal device to rectify the voltage and charge a capacitor that acts as a power supply temporarily closing a switch and causing the clamping effect.

Figure 12:
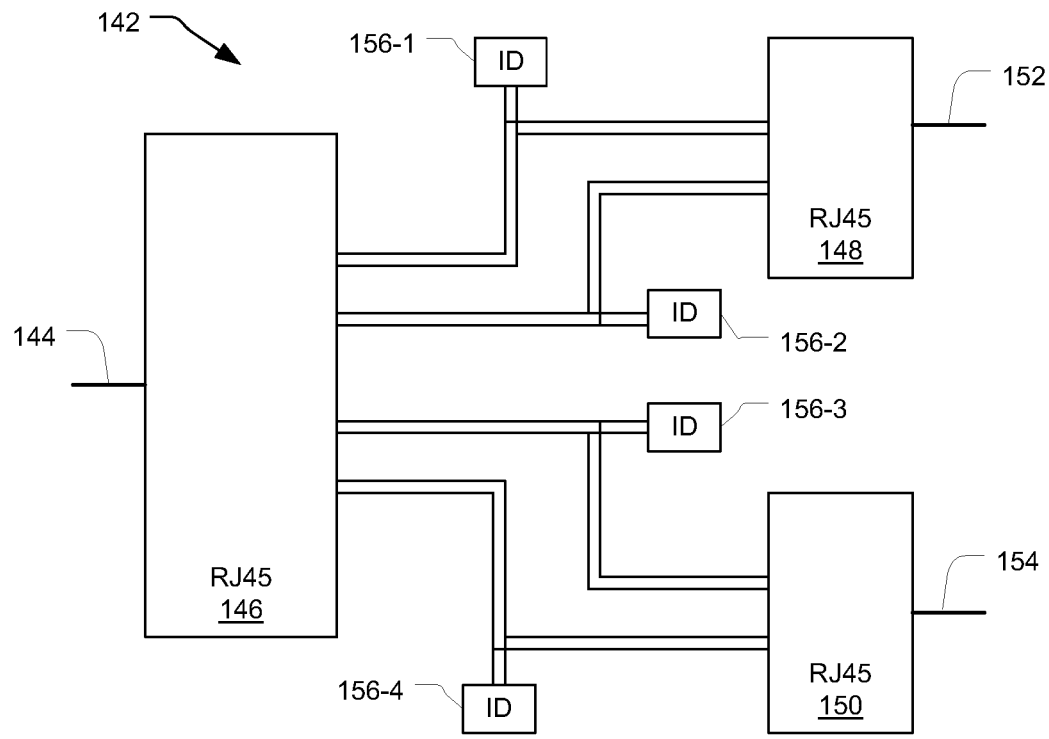
FIG. 12 is a block diagram of a communications system including a pair-splitter employing single-pair discovery and identity circuitry in accordance with the present invention.

FIG. 12 shows a pair-splitter element 142 (referred to as a "dongle") where the four pairs of a twisted-pair cable 144 terminated at a first RJ45 connector 146 are routed to two separate RJ45 connectors 148, 150. This arrangement allows a device attached to the RJ45 connector 146 to supply data and/or power to two different devices over two different twisted pair cables 152, 154 attached to the RJ45 connectors 148 and 150. One or more single pair identity circuits such as shown at 156-1, 156-2, 156-3 and 156-4 may be used to allow devices attached to any of the RJ45 connectors 146, 148 and 150 to check for the presence of the dongle 142.

Figure 13:
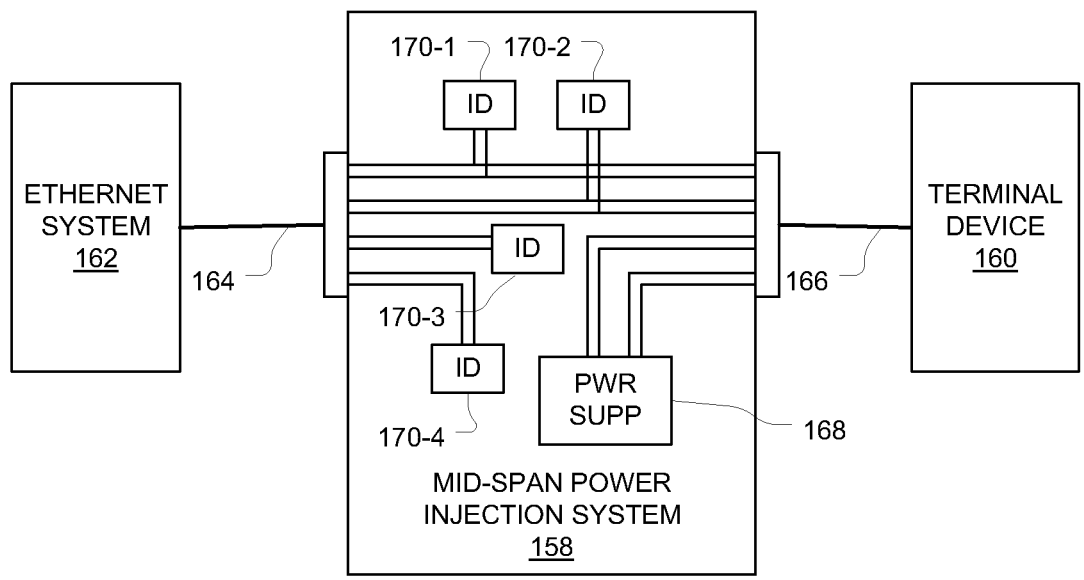
FIG. 13 is a block diagram of a communications system including a mid-span power injector employing single-pair discovery and identity circuitry in accordance with the present invention.

FIG. 13 shows another application in which a single-pair identity circuit may be useful. In this case, a mid-span power injection system 158 is deployed between a terminal device 160 and an Ethernet system 162 (e.g. a switch) capable of supplying data and/or inline power or both via a twisted pair cable 164. The mid-span power injection system 158 uses two or more pairs of a twisted pair cable 166 to provide inline power from a power supply 168 to the terminal device 160 without affecting the data and/or power from the Ethernet system 162. In this example, the mid-span power injector 158 passes the DC and AC signals on two conductor pairs of the cable 164 to the cable 166 while acting differently upon the other two pairs. Specifically, the mid-span power injection system 158 effectively cuts and terminates two pairs of the cable 164 and delivers inline power to the terminal device 160 over the corresponding pairs of the cable 166. One or more single-pair identity circuits such as shown at 170-1, 170-2, 170-3 and 170-4 may be used to identify the mid-span power injection system 158 to attached devices such as the Ethernet system 162 and/or the terminal device 160. As described below, a classification technique may be used to provide additional information about the mid-span power-injection system 158, such as the amount of power it can deliver, the pair(s) of the cable it uses, etc.

Figure 14:
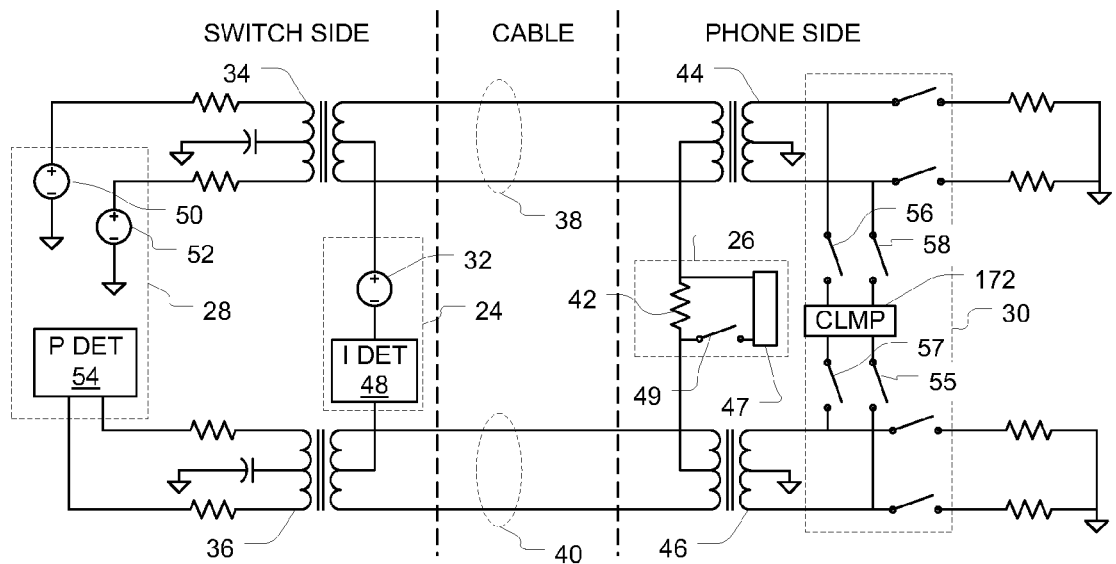
FIG. 14 is a schematic diagram of a communications system employing clamping circuitry like that of FIGS. 8 or 9 in conjunction with isolating switches between two conductor pairs.

FIG. 14 shows a use of clamping circuitry (CLMP) 172 similar to the clamping circuits 108, 126 of FIGS. 8 and 9. The clamping circuitry 172 is placed between pairs of loopback switches 56, 58 and 55, 57. The clamping circuitry 172 includes one or more sets of diodes that may be arranged for unidirectional clamping (similar to circuit 126) or bi-directional clamping (similar to circuit 108). However, there is no need for biasing transistors such as transistors 118-124 (FIG. 8) or 130-132 (FIG. 9), because the loopback switches 55-58 provide the necessary isolation of the clamping circuit 172 during normal operation when data packets are going through. There is also no need for a DC-blocking element such as capacitors 117, 119 or 129 (FIGS. 8 and 9), zener diode 138 (FIG. 10) or switch 140 (FIG. 11). As yet another alternative, the clamping circuit 172 may be placed across any two conductor pairs of a multiple-conductor cable; it need not be placed across a transmit and receive pair but any two pairs in a four-pair cable configuration.

More generally, any of the clamping circuits presented in FIGS. 5, 6, and 8-11 may be utilized in the clamping circuit 172 of FIG. 14. Such clamping circuits may provide better data loopback attenuation performance (attenuation of higher signal amplitudes), while providing an identity circuit that does not affect data transfer when power is applied, due to the function of the switches 55-58. Also, cost performance is improved because separate biasing components such as transistors 118-124 and 130-132 and DC-blocking elements such as capacitors 117, 119 or 129 etc. are not necessary.

In a system such as that of FIG. 14, the switches 55-58 and the clamping circuit 172 provide a means to temporarily connect two conductor pairs such as the two pairs 38, 40. This allows the discovery circuitry in an Ethernet system or switch to choose one of the two pairs to examine for the clamping effect on the discovery pulses during the discovery phase. Amplitude measurements for the clamping effect may be done on the same pair (as applicable for the other single-pair identity circuits presented herein) or may be taken on the other pair. If the measurements are taken on the other pair, the extra signal attenuation caused by the longer path should be taken into account. One benefit of using the other (non-transmit) pair is that the discovery pulse generator need not have a receiver active across it. As in the case of a 10/100 setup, the transmitter generates the discovery pulse and the receiver (residing on the other pair joined to the transmit pair via the switches) can receive the transmitted signal. If a uni-polar clamp (e.g. a single-pair identity circuit such as shown in FIG. 3) is utilized in the clamping circuit 172, then a differential signal starting on one pair is received as an attenuated signal (having traveled twice the distance of the cable) in addition to exhibiting the uni-polar clamping effect of the diode. Such a signal is different from the signal received when the diode clamping circuit 172 is absent. In that case, the signal is symmetrical because the cable generally has symmetrical attenuation. Thus, the receiver looks for a non-symmetrical pulse attenuation that results when the diode clamps one side of the signal. While in the above description the single-pair discovery circuitry (e.g. discovery circuitry 18 of FIG. 1) is described as detecting one specific conduction characteristic indicating the presence or absence of single-pair identity circuitry, in alternative embodiments the discovery circuitry may be capable of detecting multiple distinct characteristics so as to be capable of classifying any single-pair identity circuitry that is present, and thereby classify the device containing such single-pair identity circuitry. For example, the discovery circuitry may be capable of detecting multiple clamping levels and polarities of identity signals, which are caused by respective single-pair identity circuits having zener diodes with corresponding different breakdown voltages. As an additional or alternative classification dimension, the discovery circuitry may distinguish between unidirectional and bi-directional clamping, and/or various combinations of clamping of the positive and negative peaks of the identity signal(s). By utilizing combinations of these characteristics, it may be possible to identify 10-20 or more distinct device types.

In addition, the above functions can be performed while common mode, differential discovery, and auto-negotiation circuitry are permitted to work in parallel. Discovery pulses may be imbedded within auto-negotiation pulses as specified in IEEE 802.3 standards without affecting the recognition of legacy Ethernet devices connected to an RJ45 connector for which this discovery is enabled. Any one of the discovery algorithms mentioned here can be enabled and disabled at will upon a request from the user.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A communications system comprising:
   a first communications device operative to supply power at an interface; and
   a second communications device coupled to the interface of the first communications device via a multiple-conductor-pair cable;
   wherein the first communications device includes (1) a single-pair identity signal generator operative to generate a single-pair identity signal on one conductor pair of the cable, the single-pair identity signal having an amplitude greater than the amplitude of communications signals appearing on the conductor pair and substantially less than the amplitude of a power signal generated on the conductor pair by the first communications device, and (2) a single-pair sensor operative to sense a predetermined conduction characteristic of the conductor pair of the cable indicative of the presence of a single-pair identity circuit;
   and wherein the second communications device includes the single-pair identity circuit coupled to the conductor pair of the cable, the single-pair identity circuit being activated by the single-pair identity signal on the conductor pair to create the predetermined conduction characteristic of the conductor pair to be sensed by the single-pair sensor of the first communications device.

2. A communications system according to claim 1, further comprising a third communications device coupled to the multiple-conductor-pair cable and having a multiple-pair identity circuit activated by a multiple-pair identity signal appearing on the conductor pair of the cable, the multiple-pair identity circuit not being activated by the single-pair identity signal, and the single-pair identity circuit not being activated by the multiple-pair identity signal.

3. A communications system according to claim 2, wherein the multiple-pair identity circuit comprises a common-mode identity circuit.

4. A communications system according to claim 2, wherein the multiple-pair identity circuit comprises a differential-mode identity circuit.

5. A communications system according to claim 1, wherein the single-pair identity circuit includes a zener diode connected across the conductors of the one conductor pair.

6. A communications system according to claim 5, wherein the zener diode is a first of a pair of zener diodes connected back-to-back across the conductors of the one conductor pair.

7. A communications system according to claim 1, wherein the conduction characteristic is a lowered termination impedance of the one conductor pair sensed by the single-pair sensor of the first communications device.

8. A communications system according to claim 7, wherein the lowered termination impedance is sensed as a signal amplitude different from a signal amplitude occurring when the one conductor pair is terminated by a characteristic impedance.

9. A communications system according to claim 1, wherein the first and second communications devices each include respective isolating transformers at which the one conductor pair terminates.

10. A communications system according to claim 1, wherein the second communications device is one of multiple types identified by different conduction characteristics of the one conductor pair, and wherein the sensor of the first communications device is operative to distinguish the different conduction characteristics so as to classify the type of the second communications device.

11. A communications system according to claim 10, wherein the different conduction characteristics are identified as corresponding different signal amplitudes.

12. A communications system according to claim 10, wherein the different conduction characteristics are identified as corresponding different polarities of signal levels.

13. A communications system according to claim 1, wherein the single-pair identity circuit includes one or more transistors operative to enable the single-pair identity circuit to operate when there is no power to the second communications device and to disable the single-pair identity circuit when there is power to the second communications device.

14. A communications system according to claim 1, wherein the single-pair identity circuit is a clamping circuit, and wherein the second communications device further includes one or more pairs of isolating switches operative (1) when there is no power to the second communications device to connect the clamping circuit between the one conductor pair and another conductor pair of the cable, and (2) when there is power to the second communications device, to isolate the single-pair identity circuit from the one conductor pair.

15. A communications system according to claim 1, wherein the second communications device is a re-wiring device operative to configure the first communications device and a third communications device in a redundancy arrangement.

16. A communications system according to claim 1, wherein the second communications device is a re-wiring device operative to interconnect the first communications device with third and fourth communications devices.

17. A communications system according to claim 1, wherein the second communications device is a re-wiring device operative to interconnect the first communications device with a third communications device, and wherein the single-pair identity circuit is complementary with a single-pair identity circuit within the third communications device coupled to the same conductor pair of the multiple-conductor-pair cable.

18. A communications system according to claim 1, wherein the second communications device is a mid-span power injector operative (1) to interconnect the first communications device with a third communications device via at least one pair of the multiple-conductor-pair cable from the first communications device and a corresponding at least one pair of a multiple-conductor-pair cable to the third communications device, and (2) to terminate at least one other pair of the multiple-pair conductor cable and provide inline power to the third communications device via a corresponding at least one other pair of the multiple-conductor-pair cable to the third communications device.

19. A communications device, comprising:
   a single-pair identity circuit coupled to a single conductor pair of a multiple-conductor-pair cable, the single-pair identity circuit being activated by a single-pair identity signal on the conductor pair to create a predetermined conduction characteristic of the conductor pair to be sensed by a single-pair sensor of a separate communications device also coupled to the multiple-conductor-pair cable.

20. A communications device according to claim 19, wherein the single-pair identity circuit includes a zener diode connected across the conductors of the one conductor pair.

21. A communications device according to claim 20, wherein the zener diode is a first of a pair of zener diodes connected back-to-back across the conductors of the one conductor pair.

22. A communications device according to claim 19, wherein the single-pair identity circuit includes one or more transistors operative to enable the single-pair identity circuit to operate when there is no power to the communications device and to disable the single-pair identity circuit when there is power to the communications device.

23. A communications device according to claim 19, wherein the single-pair identity circuit is a clamping circuit, and further comprising one or more pairs of isolating switches operative (1) when there is no power to the communications device to connect the clamping circuit between the one conductor pair and another conductor pair of the cable, and (2) when there is power to the communications device, to isolate the single-pair identity circuit from the one conductor pair.

24. A communications device according to claim 19, further comprising an isolating transformer at which the single conductor pair terminates.

25. A communications device according to claim 19, constituting a re-wiring device operative to configure separate communications devices in a redundancy arrangement.

26. A communications device according to claim 19, constituting a re-wiring device operative to interconnect a first separate communications device with second and third separate communications devices.

27. A communications device according to claim 19, constituting a re-wiring device operative to interconnect a first separate communications device with a second separate communications device, and wherein the single-pair identity circuit is complementary with a single-pair identity circuit within the second separate communications device coupled to the same conductor pair of the multiple-conductor-pair cable.

28. A communications device according to claim 19, constituting a mid-span power injector operative (1) to interconnect a separate first communications device with a separate second communications device via at least one pair of the multiple-conductor-pair cable from the separate first communications device and a corresponding at least one pair of a multiple-conductor-pair cable to the separate second communications device, and (2) to terminate at least one other pair of the multiple-pair conductor cable and provide inline power to the separate second communications device via a corresponding at least one other pair of the multiple-conductor-pair cable to the separate second communications device.

29. A method of operating a communications system, comprising:

at a first communications device operative to supply power at an interface, (1) generating a single-pair identity signal on one conductor pair of a multiple-conductor-pair cable connecting the first communications device with a second communications device, the single-pair identity signal having an amplitude greater than the amplitude of communications signals appearing on the conductor pair and substantially less than the amplitude of a power signal generated on the conductor pair by the first communications device, and (2) sensing a predetermined conduction characteristic of the conductor pair of the cable indicative of the presence of a single-pair identity circuit; and at the second communications device, responding to the single-pair identity signal on the conductor pair to create the predetermined conduction characteristic of the conductor pair to be sensed by first communications device.

* * * * *

UNITED STATES PATENT AND TRADEMARK OFFICE
CERTIFICATE OF CORRECTION

PATENT NO. : 7,599,485 B2  Page 1 of 1
APPLICATION NO. : 11/166440
DATED : October 6, 2009
INVENTOR(S) : Roger Karam It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Twenty-eighth Day of September, 2010

David J. Kappos
*Director of the United States Patent and Trademark Office*